US012124621B2

(12) United States Patent
Luk et al.

(10) Patent No.: US 12,124,621 B2
(45) Date of Patent: Oct. 22, 2024

(54) HANDS-FREE GESTURES FOR ACCOUNT AUTHENTICATION (71) Applicant: eBay Inc., San Jose, CA (US)

(72) Inventors: Bryant Genepang Luk, Round Rock, TX (US); Robert He, Pflugerville, TX (US); Christopher Diebold O'Toole, Cedar Park, TX (US); Jennifer T. Robertson, Cedar Park, TX (US); Yu Tang, Round Rock, TX (US)

(73) Assignee: EBAY INC., San Jose, CA (US)

( * ) Notice: Subject to any disclaimer, the term of this patent is extended or adjusted under 35 U.S.C. 154(b) by 198 days.

(21) Appl. No.: 17/370,142

(22) Filed: Jul. 8, 2021

(65) Prior Publication Data

US 2021/0333861 A1 Oct. 28, 2021

Related U.S. Application Data (63) Continuation of application No. 15/886,082, filed on Feb. 1, 2018, now Pat. No. 11,093,022, which is a
(Continued)

(51) Int. Cl.
*H04L 12/06* (2006.01)
*G06F 3/01* (2006.01)
(Continued)

(52) U.S. Cl.
CPC ............... *G06F 3/01* (2013.01); *G06F 3/017* (2013.01); *G06F 21/31* (2013.01); *G06F 21/32* (2013.01);
(Continued)

(58) Field of Classification Search
CPC . G06F 3/01; G06F 3/017; G06F 21/31; G06F 21/32; G06Q 30/00; G06Q 30/06;
(Continued)

(56) References Cited

U.S. PATENT DOCUMENTS 9,773,245 B1 * 9/2017 Patel ..................... G06F 21/32
11,093,022 B2 8/2021 Luk et al.
(Continued)

FOREIGN PATENT DOCUMENTS

WO 2017/151700 A1 9/2017
WO WO-2018035129 A1 * 2/2018 ........... A61B 5/1123

OTHER PUBLICATIONS

Jack Sturgess, Simon Eberz, Ivo Sluganovic, Ivan Martinovic; "Inferring User Height and Improving Impersonation Attacks in Mobile Payments using a Smartwatch"; IEEE International Conference on Pervasive Computing and Communications Workshops and other Affiliated Events; Conference Paper; pp. 775-780 (Year: 2022).*

(Continued)

*Primary Examiner* — Fatoumata Traore
*Assistant Examiner* — Courtney D Fields
(74) *Attorney, Agent, or Firm* — SCHWEGMAN LUNDBERG & WOESSNER, P.A.

(57) ABSTRACT

Systems and methods are provided for authenticating an account via a hands-free gesture, such as a tap, pattern of taps, or other physical gesture not requiring a user to hold a computing device. A user can initiate a transaction to purchase an item by interacting with a first computing device (e.g., electronic kiosk, point-of-sale terminal, automated checkout device, etc.). The first computing device can receive a request from the user to purchase the item. In response, the first computing device can broadcast an authentication request. The user can perform the hands-free gesture for detection by a second computing device (e.g., the user's mobile device). The second computing device can transmit information associated with the hands-free gesture in response to the authentication request. The first comput-
(Continued)

ing device can authenticate the user based on the information associated with the hands-free gesture.

18 Claims, 8 Drawing Sheets

Related U.S. Application Data continuation of application No. 14/281,828, filed on May 19, 2014, now abandoned.

(51) Int. Cl.
| | | |
|---|---|---|
| *G06F 21/31* | (2013.01) | |
| *G06F 21/32* | (2013.01) | |
| *G06Q 30/00* | (2023.01) | |
| *G06Q 30/06* | (2023.01) | |
| *H04W 12/08* | (2021.01) | |
| *G06F 21/36* | (2013.01) | |
| *H04L 9/32* | (2006.01) | |
| *H04W 12/06* | (2021.01) | |
| *H04W 12/68* | (2021.01) | |
| *H04W 12/72* | (2021.01) | |

(52) U.S. Cl.
CPC ............ *G06Q 30/00* (2013.01); *G06Q 30/06* (2013.01); *H04W 12/08* (2013.01); *H04W 12/06* (2013.01); *H04W 12/68* (2021.01); *H04W 12/72* (2021.01)

(58) Field of Classification Search
CPC ..... H04W 12/08; H04W 12/06; H04W 12/68; H04W 12/72
See application file for complete search history.

(56) References Cited

U.S. PATENT DOCUMENTS

| | | |
|---|---|---|
| 2011/0237301 A1 | 9/2011 | Patel et al. |
| 2013/0080276 A1 | 3/2013 | Granbery |
| 2014/0300540 A1* | 10/2014 | Beadle ................. G06Q 20/322 345/156 |
| 2014/0324610 A1 | 10/2014 | Ans et al. |
| 2015/0081550 A1 | 3/2015 | Priebatsch et al. |
| 2015/0186871 A1 | 7/2015 | Laracey |
| 2015/0332033 A1 | 11/2015 | Luk et al. |
| 2016/0070439 A1* | 3/2016 | Bostick ................. G06F 3/0304 715/728 |
| 2018/0157316 A1 | 6/2018 | Luk et al. |

OTHER PUBLICATIONS

Final Office Action received for U.S. Appl. No. 14/281,828, mailed on Mar. 7, 2016, 16 pages.
Final Office Action received for U.S. Appl. No. 14/281,828, mailed on Nov. 3, 2017, 16 pages.
Final Office Action received for U.S. Appl. No. 14/281,828, mailed on Nov. 30, 2016, 12 pages.
Non-Final Office Action received for U.S. Appl. No. 14/281,828, mailed on Apr. 19, 2017, 15 pages.
Non-Final Office Action received for U.S. Appl. No. 14/281,828, mailed on Aug. 12, 2016, 16 pages.
Non-Final Office Action received for U.S. Appl. No. 14/281,828, mailed on Sep. 24, 2015, 13 pages.
Advisory Action received for U.S. Appl. No. 15/886,082, mailed on Mar. 17, 2020, 3 pages.
Final Office Action received for U.S. Appl. No. 15/886,082, mailed on Jan. 13, 2020, 18 pages.
Non-Final Office Action received for U.S. Appl. No. 15/886,082, mailed on Jul. 12, 2019, 15 pages.
Non-Final Office Action received for U.S. Appl. No. 15/886,082, mailed on Oct. 30, 2020, 17 pages.
Notice of Allowance received for U.S. Appl. No. 15/886,082, mailed on Apr. 7, 2021, 12 pages.
Feng et al., "USR: Enabling Identity Awareness and Usable App Access Control during hand-free Mobile Interactions", 2014, pp. 225-234.

* cited by examiner

HANDS-FREE GESTURES FOR ACCOUNT AUTHENTICATION

CLAIM OF PRIORITY

This application is a continuation of U.S. application Ser. No. 15/886,082, filed Feb. 1, 2018, which claims the benefit of priority of U.S. application Ser. No. 14/281,828, filed May 19, 2014, each of which is hereby incorporated by reference in its entirety.

TECHNICAL FIELD

The present application relates generally to the technical field of computerized transactions and, in one specific example, providing access to an account via a computing device associated with a transaction(s).

BACKGROUND

Many conventional computing contexts involve the use of computers to create and complete transactions. A conventional computing device may execute internet browsing software to view products available through a retail website. A selection of a particular product can be sent from the conventional computing device. The retail website may have an account with data related to a user of the conventional computing device. The account data may have financial information for payment of the price of the particular product. Upon receiving an indication that the particular product has been selected. The retail website can execute a completion of a purchase transaction for the particular product against the financial information in the account data.

BRIEF DESCRIPTION OF THE DRAWINGS

Some embodiments are illustrated by way of example and not limitation in the figures of the accompanying drawings.

DETAILED DESCRIPTION

Example methods and systems directed to a Transaction Manager (hereinafter "TM") are described. In the following description, for purposes of explanation, numerous specific details are set forth in order to provide a thorough understanding of example embodiments. It will be evident, however, to one skilled in the art that the present invention may be practiced without these specific details.

According to various embodiments described herein, the TM generates modules and sends modules to various computing devices. The modules, when executed on a computing device(s), cause a computing device(s) to execute various actions described below.

In one example embodiment, the TM receives a request from a wireless mobile device for modules generated by the TM. Upon receiving the request, the TM sends the requested modules to the wireless mobile device. Upon executing the modules, the wireless mobile device receives a transaction initiation message (sent by another computing device) and presents an alert (e.g. sound, vibration) upon receipt of the transaction initiation message. The wireless mobile device detects an occurrence of a physical gesture and recognizes the occurrence of the physical gesture as authorization to proceed with a transaction. The wireless mobile device sends a response to the transaction initiation message based on detecting the occurrence of the physical gesture. The response includes a customer identification for the transaction. The customer identification is associated with an account through which the transaction can be fulfilled.

By generating and sending modules to cause the wireless mobile device (or any kind of computing device) to detect an occurrence of a physical gesture as a transaction authorization, the TM adds convenience to a purchasing experience of a user of the wireless mobile device. In a scenario where the wireless mobile device is in the user's pocket, the wireless mobile device detects an effect of the user performing a tapping pattern. Upon detecting the tapping pattern, the wireless mobile device can proceed with a transaction. The modules generated for and sent to the wireless mobile device by the TM thereby allow the user to proceed with transactions via the wireless mobile device without requiring the user to manually enter input data into the wireless mobile device.

It is understood that, in various embodiments, any of the modules generated by the TM described herein comprise source code that, when compiled by a computing device(s), creates object code that causes the computing device(s) to perform various actions described herein. In other embodiments, any of the modules generated by the TM described herein comprise object code that causes the computing device(s) to perform various actions described herein.

Figure 1:
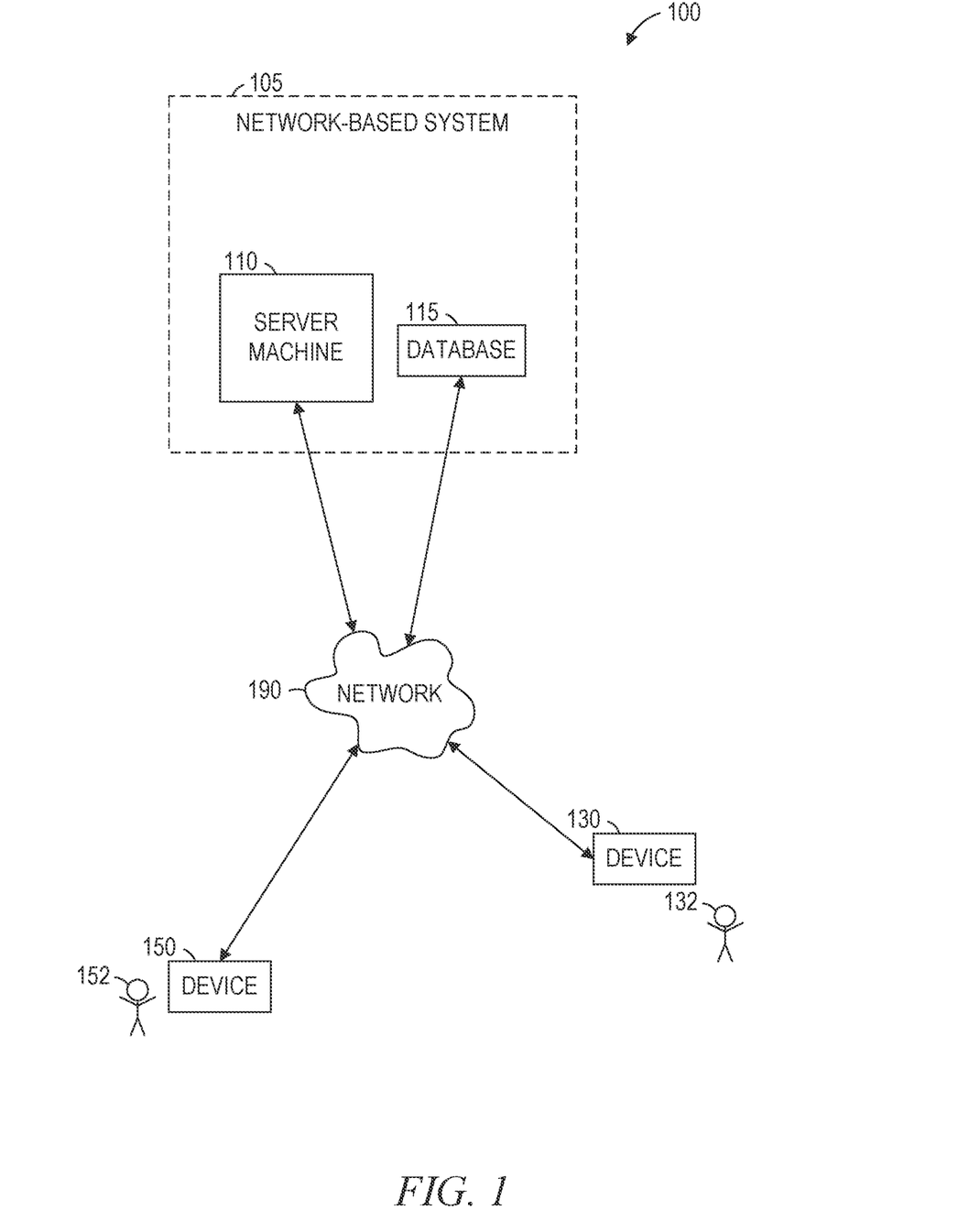
FIG. 1 is a network diagram illustrating a network environment suitable for a Transaction Manager, according to some example embodiments.

FIG. 1 is a network diagram illustrating a network environment 100 suitable for a Transaction Manager, according to some example embodiments. The network environment 100 includes a server machine 110, a database 115, and devices 130 and 150, all communicatively coupled to each other via a network 190. The server machine 110 may form all or part of a network-based system 105 (e.g., a cloud-based server system configured to provide one or more services to the devices 130 and 150). The server machine 110 and the devices 130 and 150 may each be implemented in a computer system, in whole or in part, as described below with respect to FIG. 8. It is further understood that a Transaction Manager can also be implemented in a computer system, in whole or in part, as described below with respect to FIG. 8.

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, a smartphone, or a wearable device (e.g., a smart watch or smart glasses) belonging to the user 132. Likewise, the user 152 is not part of the network environment 100, but is associated with the device 150. As an example, the device 150 and device 130 may each be a desktop computer, a vehicle computer, a tablet computer, a navigational device, a portable media device, a smartphone, a wireless mobile device, a point-of-sale device, a kiosk computing device or a wearable device (e.g., a smart watch or smart glasses) belonging to the user 132.

Any of the machines, databases, or devices shown in FIG. 1 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 11. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
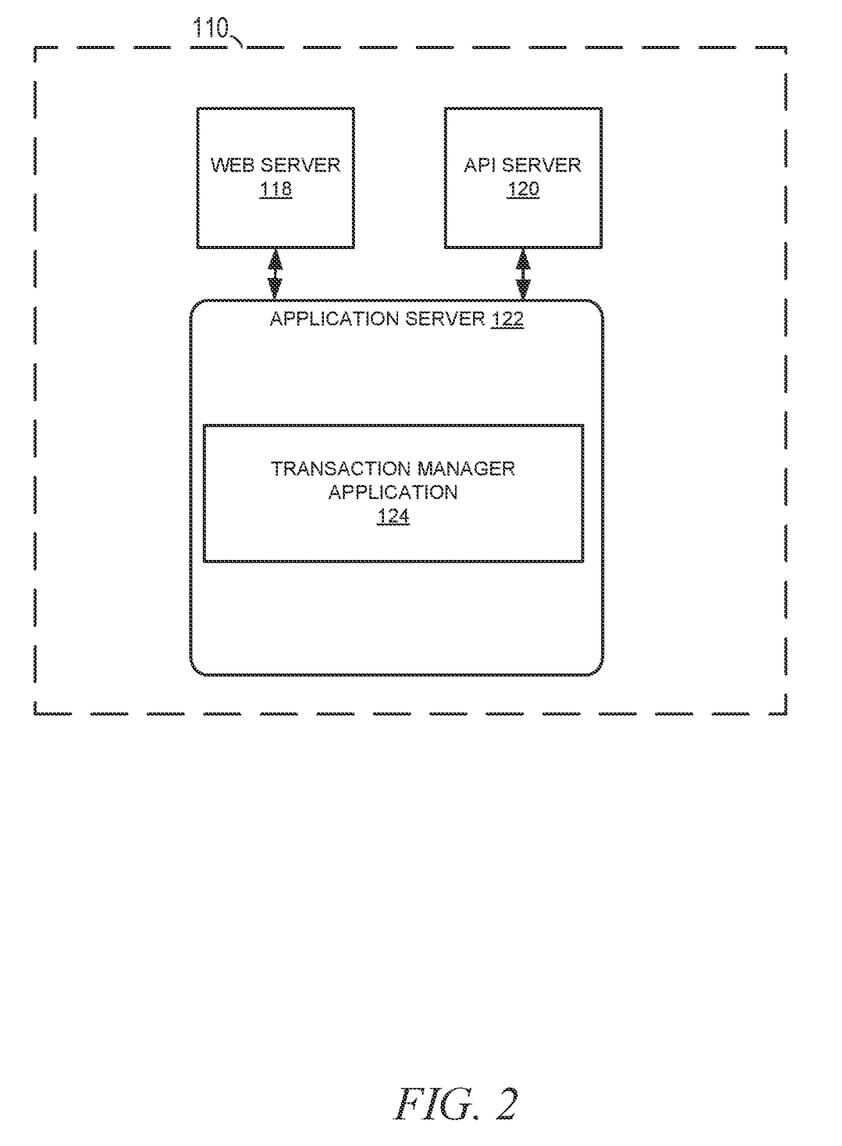
FIG. 2 is a block diagram illustrating components of a server machine suitable for Transaction Manager, according to some example embodiments.

FIG. 2 is a block diagram illustrating components of the server machine 110, according to some example embodiments. The server machine 110 is shown as including an Application Program Interface (API) server 120 and a web server 118 that are coupled to, and provide programmatic and web interfaces respectively to, an application server(s) 122. The application server 122 hosts a Transaction Manager application 124. The Transaction manager application 124 generates and sends the modules to various computing devices 130, 150 based on receiving respective requests for the modules from the various computing devices 130, 150. The modules cause the computing devices 130, 150 to perform various actions described below.

While the Transaction Manager application 124 is shown in FIG. 2 to form part of the network-based system 105, it will be appreciated that, in alternative embodiments, the Transaction Manager application 124 may form part of a service that is separate and distinct from the network-based system 105.

Figure 3:
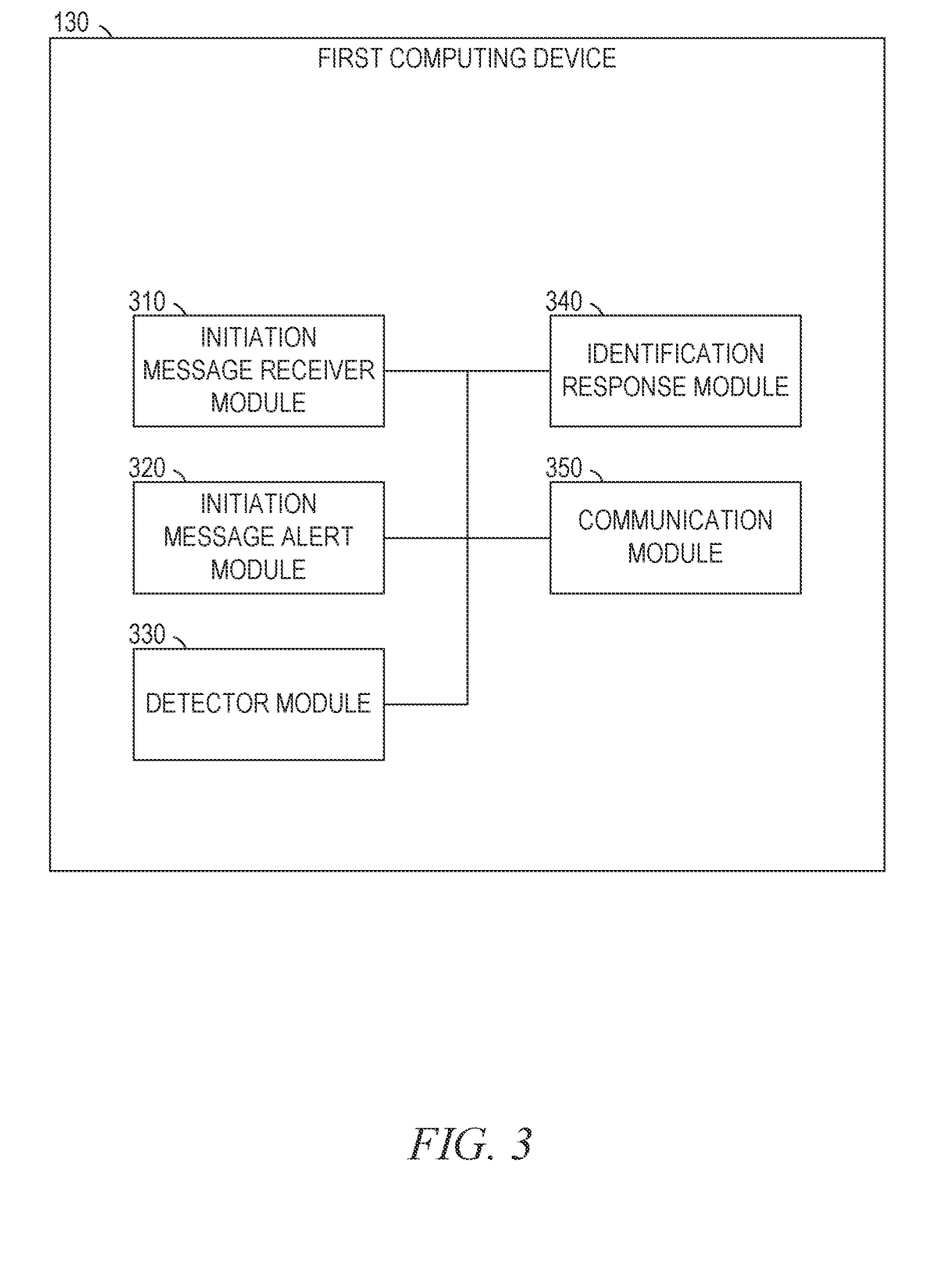
FIG. 3 is a block diagram illustrating various modules generated by a Transaction Manager to cause a first computing device to perform various actions consistent with some embodiments of the present invention described herein.

FIG. 3 is a block diagram illustrating various modules generated by a Transaction Manager to cause a first computing device to perform various actions consistent with some embodiments of the present invention described herein.

As illustrated in FIG. 3, the first computing device 130 includes an initiation message receiver module 310 generated by the TM 124. When executed by the first computing device 130, the initiation message receiver module 310 causes the first computing device 130 to receive a transaction initiation message sent by a second computing device 150 for receipt by any computing device within a predetermined distance.

The first computing device 130 includes an initiation message alert module 320 generated by the TM 124. When executed by the first computing device 130, the initiation message alert module 320 causes a first computing device 130 to present an alert based on receipt of the transaction initiation message.

The first computing device 130 includes a detector module 330 generated by the TM 124. When executed by the first computing device 130, the detector module 330 causes the first computing device 130 to detect an occurrence of a physical gesture(s).

The first computing device 130 includes an identification response module 340 generated by the TM 124. When executed by the first computing device 130, the identification response module 340 causes the first computing device 130 to generate a response to the transaction initiation message based on detecting the occurrence of the physical gesture(s). The identification response module 340 further causes the first computing device 130 to send the response to the second computing device 150. The response includes a customer identification for a transaction indicated in the transaction initiation message. The response can further include a token for accessing an online funded account that is associated with the user 132 of the first computing device 130.

The first computing device 130 includes a communication module 350 through which the first computing device 130 receives the initiation message receiver module 310, the initiation message alert module 320, the detector module 330 and the identification response module 340 from the TM 124. The first computing device 130 transmits data to and receives data from the second computing device 150 via the communication module 350 as well.

Figure 4:
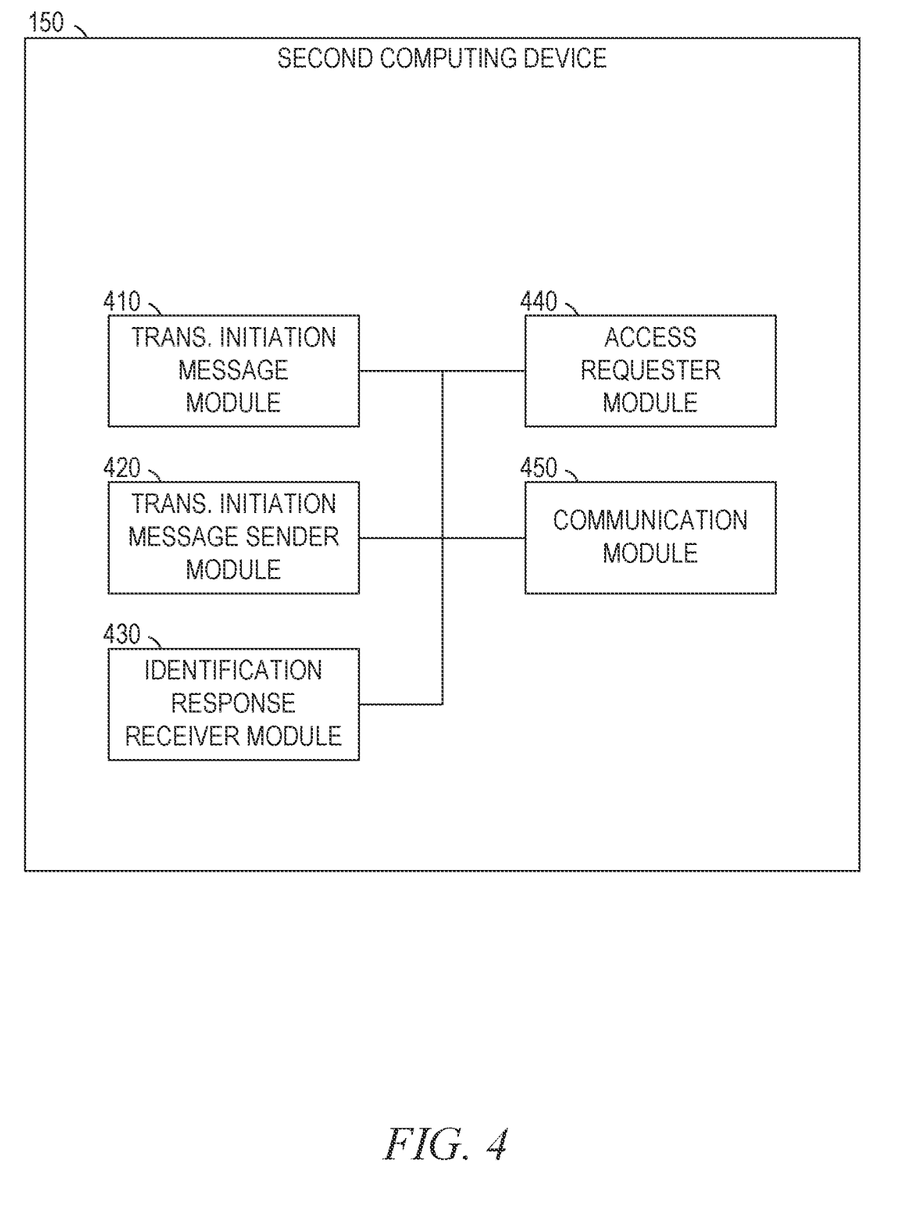
FIG. 4 is a block diagram illustrating various modules generated by a Transaction Manager to cause a second computing device to perform various actions consistent with some embodiments of the present invention described herein

FIG. 4 is a block diagram illustrating various modules generated by a Transaction Manager to cause a second computing device to perform various actions consistent with some embodiments of the present invention described herein As illustrated in FIG. 4, the second computing device 150 includes a transaction initiation message module 410. When executed, the transaction initiation message module 410 causes the second computing device 150 to generate a transaction initiation message. The second computing device 150 generates the transaction initiation message based on receipt of a transaction request. In some embodiment, the transaction request can be manual input at the second computing device 150 describing a desired transaction. In other embodiments, the transaction request can be in the form of a message transmitted to the second computing device 150 from another computing device.

The second computing device 150 includes a transaction initiation message sender module 420. When executed, the transaction initiation message sender module 420 causes the second computing device 150 to send the transaction initiation message to any computing device within the predetermined distance. In one embodiment, the transaction initiation message can be broadcast by the second computing device 150 for receipt by any computing device that happens to be near the second computing device 150.

The second computing device 150 includes an identification response receiver module 430. When executed, the identification response receiver module 430 causes the second computing device 150 to receive the response to the transaction initiation message.

The second computing device 150 includes an access requester module 440. The access requester module 440 causes the second computing device 150 to send an access request associated with the transaction to the TM 124. The access request is sent in order to request access to an account associated with the customer identification.

The second computing device 150 includes a communication module 450 through which the second computing device 150 receives the transaction initiation message module 410, the transaction initiation message sender module 420, the identification response receiver module 430 and the access requester module 440 from the TM 124. The second computing device 150 transmits data to and receives data from the first computing device 130 via the communication module 350 as well.

Figure 5:
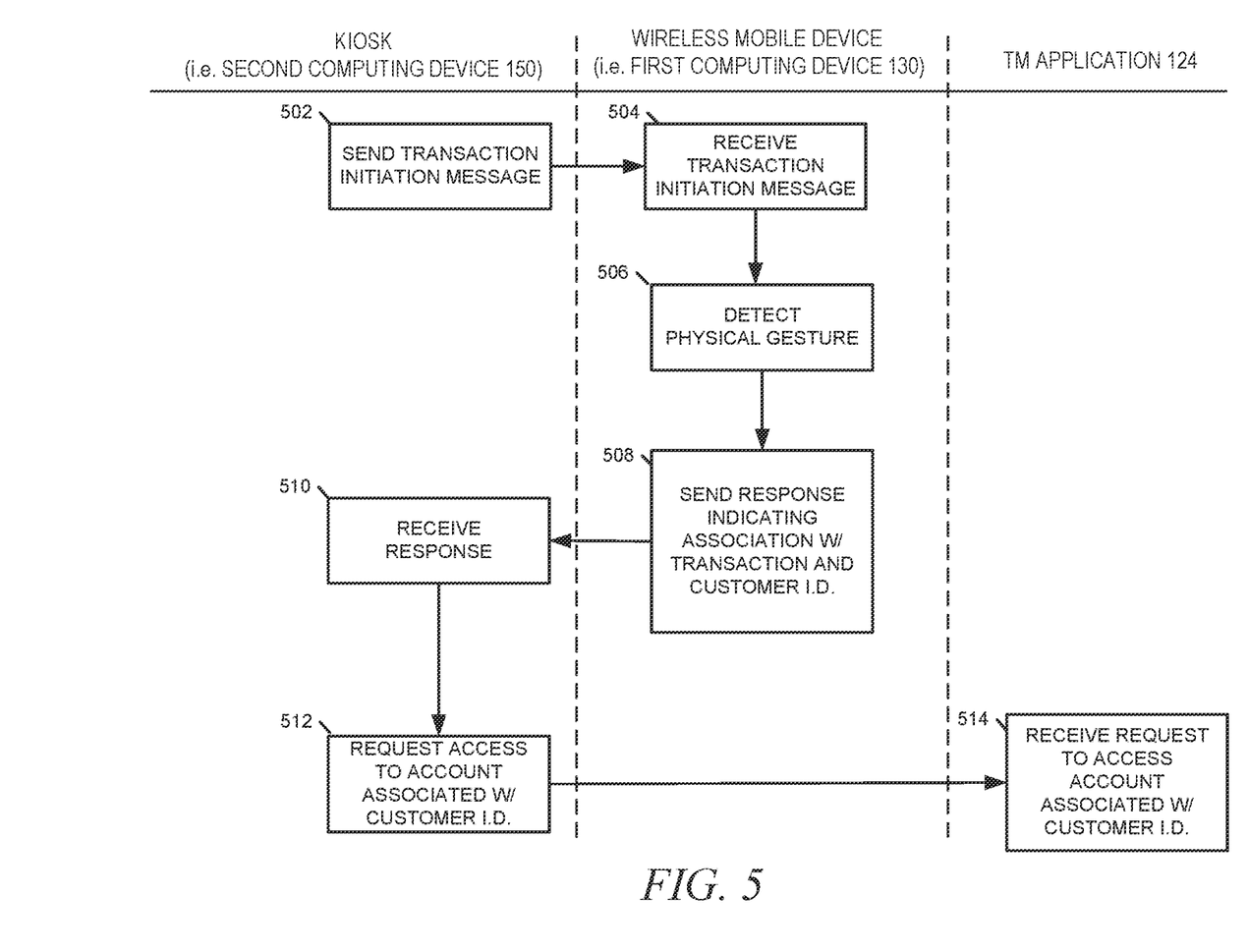
FIG. 5 is an interaction diagram showing computing devices performing actions caused by the execution of various modules generated by the TM consistent with embodiments of the present invention.

FIG. 5 is an interaction diagram showing computing devices performing actions caused by the execution of various modules generated by the TM consistent with embodiments of the present invention.

FIG. 5 depicts an example scenario utilizing various embodiments of the present invention. In such a scenario, a user 132 carrying a wireless mobile device 130 in his pocket enters a retailer's physical store. The wireless mobile device 130 runs instances of modules 310, 320, 330, 340 that cause the wireless mobile device 130 to at least perform actions 504, 506 and 508 illustrated in FIG. 5. The retailer has a kiosk computing device 150 (or any other kind of computing device). The kiosk 150 runs instances of modules 410, 420, 430, 440 that cause the kiosk 150 to at least perform actions 502, 510 and 512 illustrated in FIG. 5.

Continuing with the example scenario, the user 132 approaches the kiosk 150 and manually enters input representative of a request to purchase a product. Based on the manually entered request to purchase the product. The kiosk 150 creates a transaction initiation message for a transaction in which the product will be sold to the user 132.

At action 502, the kiosk 150 sends the transaction initiation message to any computing device that is near the kiosk 150—such as any computing device within a predetermined distance from the kiosk 150. For example, the kiosk 150 sends the transaction initiation message via Bluetooth Low Energy. In one embodiment, the transaction initiation message indicates the transaction.

At action 504, the wireless mobile device 130 in the user's pocket receives the transaction initiation message. The wireless mobile device 130 presents an alert in order to notify the user 132 of the receipt of the transaction initiation message. Such notification may be, for example, an alert sound or vibration of the wireless mobile device.

When the user 132 notices the alert, the user 132 performs a physical gesture. The physical gesture is intended by the user 132 to represent the user's confirmation that the user 132 initiated the transaction at the kiosk 150. The physical gesture is further intended by the user 132 to be the user's authorization to proceed with the transaction.

At action 506, the wireless mobile device 130 detects the occurrence of the physical gesture. In one embodiment, the wireless mobile device 130 detects an effect of at least one tapping physical gesture performed by the user 132. Such tapping can be applied by the user 132 directly on any portion of the wireless mobile device 132, or the user 132 may tap on the fabric of the pocket that surrounds the wireless mobile device 130. In some embodiments, the tapping may be a single tap. In other embodiments, the tapping consists of any pattern of taps. It is understood that any other kind of gesture(s) can be detected by the wireless mobile device 130.

In another embodiment, wireless mobile device 130 could be a wearable computing device, such as, for example, a watch, glasses, bracelet, etc. The user 132 performs a waving physical gesture with an arm upon which the watch is secured. The watch detects the effect of the waving physical gesture. Again, the waving physical gesture is intended by the user 132 to represent the user's confirmation that the user 132 initiated the transaction at the kiosk 150. The physical gesture is further intended by the user 132 to be the user's authorization to proceed with the transaction.

Based on the wireless mobile device 130 detecting the effect of the physical gesture, the wireless mobile device 130 generates a response that includes customer identification data associated with the user 132. In one embodiment, the response can further include data identifying the transaction. In another embodiment, the response can further include a token presenting data to access an account associated with the user 132. The account can have payment information, such as bank account data, credit card data, against which the transaction can be fulfilled.

At action 508, the wireless mobile device 130 sends the response to the kiosk 150. At action 510, the kiosk 150 receives the response sent from the wireless mobile device 130. At action 512, the kiosk 150 generates and sends a request to access the account associated with the user 132. The kiosk 150 sends the request to the TM 124. At step 514, the TM 124 received the request from the kiosk 150.

Figure 6:
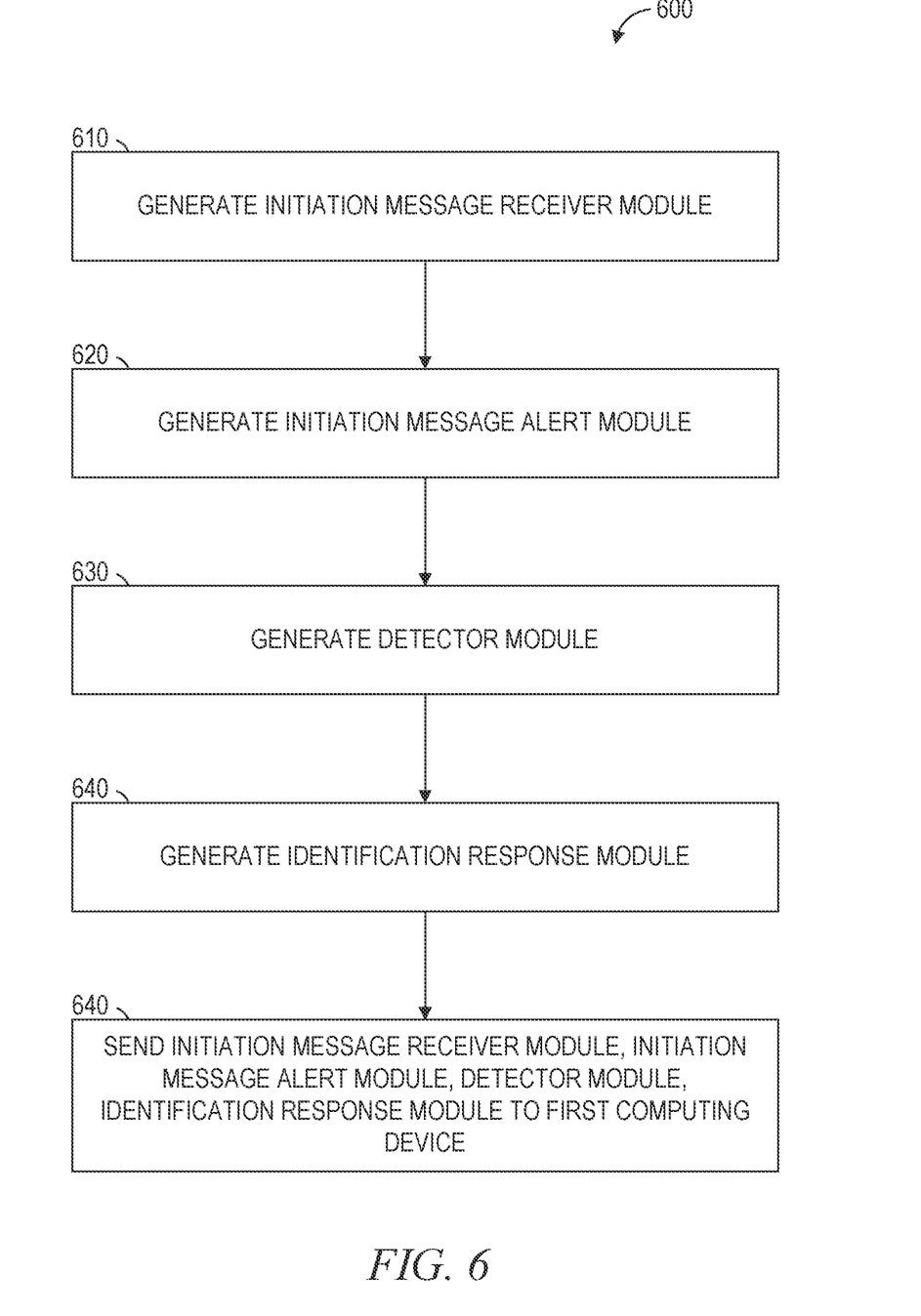
FIG. 6 is a flowchart illustrating operations of a Transaction Manager according to some example embodiments.

FIG. 6 is a flowchart 600 illustrating operations of the TM 124 according to some example embodiments. Operations illustrated in FIG. 6 may be performed by the TM 124 to at least generate the modules 310, 320, 330 340 described above with respect to FIG. 3.

At operation 610, the TM 124 generates an initiation message receiver module 310 to cause the first computing device 130 to receive a transaction initiation message. As shown in FIG. 5, the transaction initiation message is sent by the second computing device 150 for receipt by any computing device within a predetermined distance.

At operation 620, the TM 124 generates an initiation message alert module 320 to cause the first computing device 130 to present an alert based on receipt of the transaction initiation message.

At operation 630, the TM 124 generates a detector module 330 to cause the first computing device 130 to detect an occurrence of a physical gesture(s). The TM 124 can further generate the detector module 330 to include a recognition module. Upon execution by the first computing device 130, the recognition module causes the first computing device 130 to recognize the effect of a physical gesture(s) as authorization to proceed with the transaction via an account associated with a customer identification. The customer identification is further associated with the user 132 who performed the physical gesture(s).

In some embodiments, the detector module 330 can further include a wave detector module and/or a tap detector module. When executed by the first computing device 130, the wave detector module causes the first computing device 130 to detect an effect of a wave physical gesture(s). When executed by the first computing device 130, the tap detector module causes the first computing device 130 to detect an effect of a tap physical gesture(s).

At operation 640, the TM 124 generates an identification response module 340 to cause the first computing device 130 to generate a response to the transaction initiation message based on detecting the occurrence of the physical gesture(s). The identification response module 340 also causes the first computing device 130 to send the response to the second computing device 150. The response indicates the customer identification for the transaction, where the customer identification is associated with the user 132 who performed the physical gesture(s).

At step 650, the TM 124 sends the initiation message receiver module 310, the initiation message alert module 320, the detector module 330 and the identification response module 340 to the first computing device 130.

Figure 7:
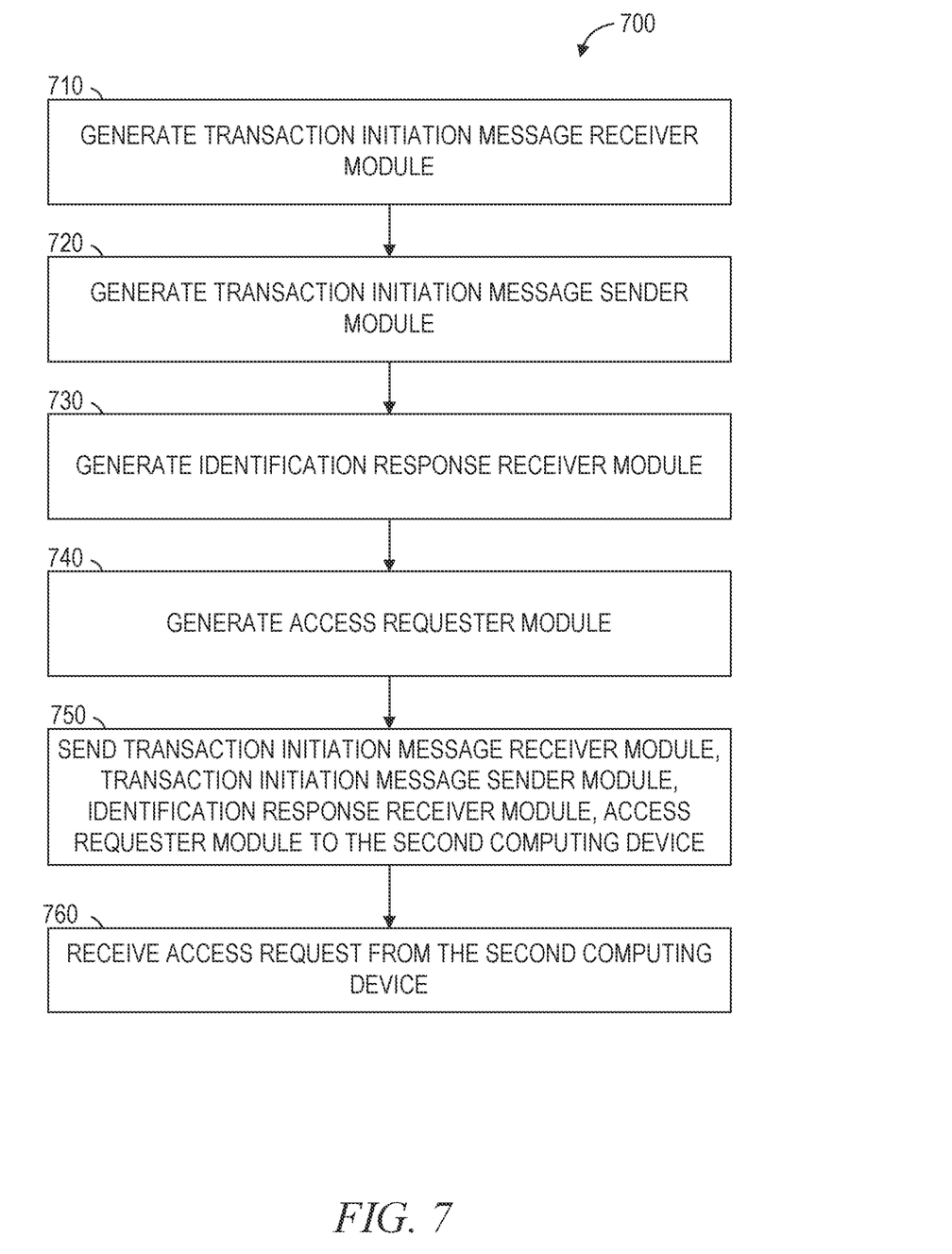
FIG. 7 is a flowchart illustrating operations of a Transaction Manager according to some example embodiments.

FIG. 7 is a flowchart 700 illustrating operations of the TM 124 according to some example embodiments. Operations illustrated in FIG. 7 may be performed by the TM 124 to at least generate the modules 410, 420, 430, 440 described above with respect to FIG. 4.

At operation 710, the TM 124 generates a transaction initiation message module 410 to cause the second computing device 150 to generate the transaction initiation message to indicate the transaction. The transaction initiation message module 410 causes the second computing device 150 to generate the transaction initiation message based on receiving any form of a transaction request—either manually entered by the user 132 or sent from the first computing device 130.

At operation 720, the TM 124 generates a transaction initiation message sender module 420 to cause the second computing device 150 to send the transaction initiation message to any computing device within the predetermined distance.

At operation 730, the TM 124 generates an identification response receiver module 430 to cause the second computing device 150 to receive the response to the transaction initiation message. The response is sent from the first computing device 130 and includes a customer identification associated with a user 132 who performed a physical gesture detected by the first computing device 130. In one embodiment, the response received by the second computing device 150 can include a token for access a remote source of payment. For example, the remote source of payment may be an online funded account associated with the user 132.

At operation 740, the TM 124 generates an access requester module 440 to cause the second computing device 150 to send an access request to the TM 124 to access an account associated with the customer identification.

At operation 750, the TM 124 sends the transaction initiation message module 410, the transaction initiation message sender module 420, the identification response receiver module 430 and the access requester module 440 to the second computing device 150.

At operation 760, the TM 124 receives the access request from the second computing device 150. In one embodiment, the access request can be a request to access the online funded account associated with the user 132 who initiated the transaction and performed the physical gestures. The TM 124 grants the second computing device 150 access to the online funded account and provides the second computing device 150 with payment information (e.g. banking data, credit card data) with which to fulfill and complete the transaction.

According to various example embodiments, one or more of the methodologies described herein may facilitate a Transaction Manager 124. It is understood that a module generated by the TM 124 to cause a computing device to detect an occurrence of a physical gesture(s) is not limited to authorization of transactions. Rather, in various embodiments, detection of an occurrence of a physical gesture(s) can be related to authorization to exchange any form of data, including but not limited to images, video, documents, personal information, etc.

For example, in one embodiment, the TM 124 can generate a module(s) that causes the second computing device 150 to send product data to the first computing device 130 upon receipt of the response to the transaction initiation message sent from the first computing device 130. The TM 124 can generate a module(s) that causes the first computing device 130 to receive the product data and complete the entire transaction from the first computing device 130 via an online funded account associated with the user 132.

In an alternative embodiment, the TM 124 can generate modules that—when executed by the first computing device 130 and the second computing device 150—cause the computing devices 130, 150 to perform the actions described below. The user 132 of the first computing device 130 presses a button on the first computing device 130. The button is associated with a file (such as a displayed image file). The first computing device 130 sends a message to computing devices within a predetermined range in response to the user 132 pressing the button. The second computing device 150 receives the message and alerts the user 152 of the second computing device 150 that the message has been received. The user 152 performs a physical gesture(s), the effect of which is detected by the second computing device 150. The second computing device 150 recognizes the user's 152 physical gesture as an authorization to request the file (such as the image file). The second computing device 150 sends a response to the message as a request to download the file from the first computing device 130. The first computing device 130 receives the request and sends the file to the second computing device 150.

In another embodiment, the TM 124 can generate modules that—when executed by the first computing device 130 and the second computing device 150—cause the computing devices 130, 150 to perform the actions described below. The second computing device 150 broadcasts a transaction initiation message based on a trigger event (such as detecting the first computing device 130). The first computing device 130 receives the transaction initiation message and alerts the user 132, such as through vibration or a sound(s). The first computing device 130 detects an occurrence of a physical gesture(s) by the user 132. Based on detecting the physical gestures(s), the first computing device 130 sends customer identification associated with the user 132 to the second computing device 150.

Based on receipt of the customer identification, the second computing device 150 creates a request for account information, where the account is associated with the user 132 of the first computing device 130. The second computing device 150 sends the request to the TM 124. The TM 124 receives the request for account information and responds to the second computing device 150 with the requested account information.

Based on receipt of the account information from the TM 124, the second computing device 150 sends a message to the first computing device 130. The message requests additional information from the user 132, such as a password or identify validation. In some embodiments, the requested additional information may be based on the account information received by the second computing device 150 from the TM 124.

The first computing device 130 received the message and generates a user interface display based on the received message. The user interface display prompts the user 132 to enter requested information (such as a password or identity validation). The first computing device 130 receives input data from the user 132 and responds to the message sent by the second computing device 150 based on receipt of the input data. The response from the first computing device 130 includes the input data from the user 132.

The second computing device 150 receives the response from the first computing device 130, which includes the input data from the user 132. The second computing device 150 sends a message to the TM 124, which includes the input data from the user 132. The TM 124 receives the message, which includes the input data from the user 132. The TM 124 authenticated the input data against the account associated with user 132. The TM 124 sends a message to the second computing device 150 indicating whether or not the input data was authenticated. If the input was authenticated, the second computing device 150 proceeds to complete the transaction by accessing the payment information in the account associated with the user 132.

In yet another alternative embodiment, the first computing device 130 initiates a flow of data after detecting a physical gesture(s) by sending information to the second computing device 150. The second computing device 150 provides a PIN/Password prompt for manual input at the second computing device 150. Once the manual input is received at the second computing device 150, the second computing device 150 sends a combination of any information originally received from the first computing device 130 as well as the manually entered PIN/Password prompt information to the TM 124 to complete the transaction.

When these effects are considered in aggregate, one or more of the methodologies described herein may obviate a need for certain efforts or resources that otherwise would be involved in Transaction Manager. Efforts expended by a user in the Transaction Manager may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 8:
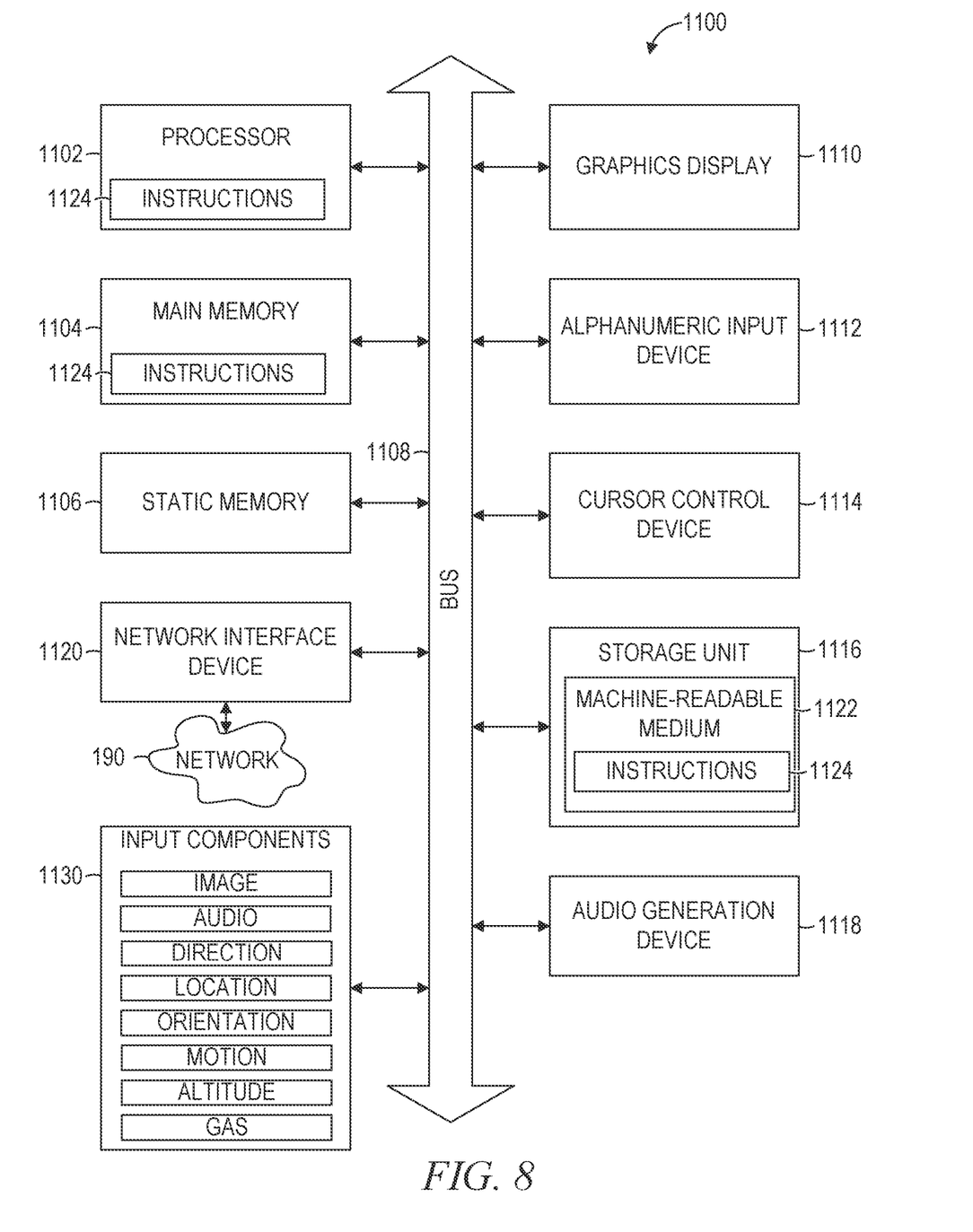
FIG. 8 is a block diagram illustrating components of a machine, according to some example embodiments, able to read instructions from a machine-readable medium and perform any one or more of the methodologies discussed herein.

FIG. 8 is a block diagram illustrating components of a machine 1100, according to some example embodiments, able to read instructions 1124 from a machine-readable medium 1122 (e.g., a non-transitory machine-readable medium, a machine-readable storage medium, a computer-readable storage medium, or any suitable combination thereof) and perform any one or more of the methodologies discussed herein, in whole or in part. Specifically, FIG. 11 shows the machine 1100 in the example form of a computer system (e.g., a computer) within which the instructions 1124 (e.g., software, a program, an application, an applet, an app, or other executable code) for causing the machine 1100 to perform any one or more of the methodologies discussed herein may be executed, in whole or in part.

In alternative embodiments, the machine 1100 operates as a standalone device or may be connected (e.g., networked) to other machines. In a networked deployment, the machine 1100 may operate in the capacity of a server machine or a client machine in a server-client network environment, or as a peer machine in a distributed (e.g., peer-to-peer) network environment. The machine 1100 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1124, sequentially or otherwise, that specify actions to be taken by that machine. Further, while only a single machine is illustrated, the term "machine" shall also be taken to include any collection of machines that individually or jointly execute the instructions 1124 to perform all or part of any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The processor 1102 may contain microcircuits that are configurable, temporarily or permanently, by some or all of the instructions 1124 such that the processor 1102 is configurable to perform any one or more of the methodologies described herein, in whole or in part. For example, a set of one or more microcircuits of the processor 1102 may be configurable to execute one or more modules (e.g., software modules) described herein.

The machine 1100 may further include a graphics display 1110 (e.g., a plasma display panel (PDP), a light emitting diode (LED) display, a liquid crystal display (LCD), a projector, a cathode ray tube (CRT), or any other display capable of displaying graphics or video). The machine 1100 may also include an alphanumeric input device 1112 (e.g., a keyboard or keypad), a cursor control device 1114 (e.g., a mouse, a touchpad, a trackball, a joystick, a motion sensor, an eye tracking device, or other pointing instrument), a storage unit 1116, an audio generation device 1118 (e.g., a sound card, an amplifier, a speaker, a headphone jack, or any suitable combination thereof), and a network interface device 1120.

The storage unit 1116 includes the machine-readable medium 1122 (e.g., a tangible and non-transitory machine-readable storage medium) on which are stored the instructions 1124 embodying any one or more of the methodologies or functions described herein. The instructions 1124 may also reside, completely or at least partially, within the main memory 1104, within the processor 1102 (e.g., within the processor's cache memory), or both, before or during execution thereof by the machine 1100. Accordingly, the main memory 1104 and the processor 1102 may be considered machine-readable media (e.g., tangible and non-transitory machine-readable media). The instructions 1124 may be transmitted or received over the network 190 via the network interface device 1120. For example, the network interface device 1120 may communicate the instructions 1124 using any one or more transfer protocols (e.g., hypertext transfer protocol (HTTP)).

In some example embodiments, the machine 1100 may be a portable computing device, such as a smart phone or tablet computer, and have one or more additional input components 1130 (e.g., sensors or gauges). Examples of such input components 1130 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1124 for execution by the machine 1100, such that the instructions 1124, when executed by one or more processors of the machine 1100 (e.g., processor 1102), cause the machine 1100 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A computer-implemented method, comprising:
   receiving, from a computing device, an authentication request at a smart watch, the authentication request being sent in response to a purchase request made at the computing device for an item by a user associated with the smart watch;
   generating an alert at the smart watch in response to receiving the authentication request;
   detecting performance of a hands-free gesture at the smart watch, the hands-free gesture performed to authorize purchase of the item in response to the alert generated by the smart watch;
   sending an authentication response to the authentication request, the authentication response including:
   a customer identification associated with an account through which a transaction associated with the purchase request can be fulfilled; and
   a pin or password where the pin or password is used to:
      retrieve user account information; and
      authenticate the account as a factor in multi-factor authorization where the authentication is performed in response to the performance of the hands-free gesture.

2. The computer-implemented method of claim 1, wherein the authentication response includes a token that includes data to access the account.

3. The computer-implemented method of claim 1, wherein method further comprises establishing a secure communication channel between the smart watch and the computing device in response sending the authentication response to the authentication request.

4. The computer-implemented method of claim 3, wherein the authentication request is received when the smart watch is a predetermined distance from the computing device.

5. The computer-implemented method of claim 1, wherein the hands-free gesture comprises a wave gesture.

6. The computer-implemented method of claim 1, wherein the hands-free gesture comprises a tap gesture.

7. A smart watch, comprising:
   a processor; and
   memory including instructions that, when executed by the processor, cause the smart watch to perform operations including:
      receiving, from a computing device, an authentication request, the authentication request being sent in response to a purchase request made at the computing device for an item by a user associated with the smart watch;
      generating an alert at the smart watch in response to receiving the authentication request;
      detecting performance of a hands-free gesture, the hands-free gesture performed to authorize purchase of the item in response to the alert generated by the smart watch;
      sending an authentication response to the authentication request, the authentication response including:
         a customer identification associated with an account through which a transaction associated with the purchase request can be fulfilled; and a pin or password where the pin or password is used to:
  retrieve user account information; and
  authenticate the account as a factor in multi-factor authorization where the authentication is performed in response to the performance of the hands-free gesture.

8. The smart watch of claim 7, wherein the authentication response includes a token that includes data to access the account.

9. The smart watch of claim 7, wherein the operations further comprise establishing a secure communication channel between the smart watch and the computing device in response sending the authentication response to the authentication request.

10. The smart watch of claim 9, wherein the authentication request is received when the smart watch is a predetermined distance from the computing device.

11. The smart watch of claim 7, wherein the hands-free gesture comprises a wave gesture.

12. The smart watch of claim 7, wherein the hands-free gesture comprises a tap gesture.

13. A non-transitory computer-readable storage medium including instructions that, when executed by one or more hardware processors of a smart watch, cause the smart watch to perform operations comprising:
  receiving, from a second computing device, an authentication request, the authentication request being sent in response to a purchase request made at the second computing device for an item by a user associated with the smart watch;
  generating an alert at the smart watch in response to receiving the authentication request;
  detecting performance of a hands-free gesture, the hands-free gesture performed to authorize purchase of the item in response to the alert generated by the smart watch;
  sending an authentication response to the authentication request, the authentication response including:
    a customer identification associated with an account through which a transaction associated with the purchase request can be fulfilled; and
    a pin or password where the pin or password is used to:
      retrieve user account information; and
      authenticate the account as a factor in multi-factor authorization where the authentication is performed in response to the performance of the hands-free gesture.

14. The non-transitory computer-readable storage medium of claim 13, wherein the authentication response includes a token that includes data to access the account.

15. The non-transitory computer-readable storage medium of claim 13, wherein the operations further comprise establishing a secure communication channel between the smart watch and the second computing device in response sending the authentication response to the authentication request.

16. The non-transitory computer-readable storage medium of claim 13, wherein the authentication request is received when the smart watch is a predetermined distance from the second computing device.

17. The non-transitory computer-readable storage medium of claim 13, wherein the hands-free gesture comprises one of:
  a wave gesture; and
  a tap gesture.

18. The non-transitory computer-readable storage medium of claim 13, wherein the hands-free gesture comprises a tap gesture.

* * * * *